United States Patent

Zehetner

[11] Patent Number: 6,061,184
[45] Date of Patent: May 9, 2000

[54] ATTACHMENT LENS

[75] Inventor: Helmut Zehetner, Gerasdorf/Niederösterreich, Austria

[73] Assignee: Photonic Optische Geräte Ges. m.b.H. & Co. KG, Vienna, Austria

[21] Appl. No.: 09/339,723

[22] Filed: Jun. 24, 1999

[30] Foreign Application Priority Data

Jul. 2, 1998 [AT] Austria ................................. 1154/98

[51] Int. Cl.⁷ ............................. G02B 3/06; G02B 6/02
[52] U.S. Cl. ........................................ 359/642; 385/124
[58] Field of Search ............................ 359/642, 653, 359/654; 385/124

[56] References Cited

U.S. PATENT DOCUMENTS 5,329,936 7/1994 Lafferty ....................................... 128/6

FOREIGN PATENT DOCUMENTS 0019309 11/1980 European Pat. Off. .
8906859 7/1989 Germany .
4130698 3/1993 Germany .

OTHER PUBLICATIONS

Applied Optics, vol. 23, No. 16, Aug. 15, 1984, pp 2670/71, "Illuminator for dark field . . ." Douglas S. Goodman.

Primary Examiner—Georgia Epps
Assistant Examiner—Michael A Lucas
Attorney, Agent, or Firm—Martin A. Farber

[57] ABSTRACT

An attachment lens is provided for an annular fiber optic illumination system which extends along a rotational axis for distributing the intensity of light beams emanating annularly from a light emanating surface of the fiber optic illumination system onto an object to be illuminated. The attachment lens comprises a ring-shaped optical element to be arranged concentrically with respect to the annular light beams and the rotational axis in a desired distance from the light emanating surface of the fiber optic illumination system. The ring-shaped optical element has a first rotationally symmetrical zone of a refractive power which increases towards the rotational axis for the annular light beams emanating from the fiber optic illumination system, and a second zone substantially for light beams which are aligned or parallel to said rotational axis. The second zone is adjacent the first zone and concentric to it and substantially free of any refractive power.

9 Claims, 5 Drawing Sheets

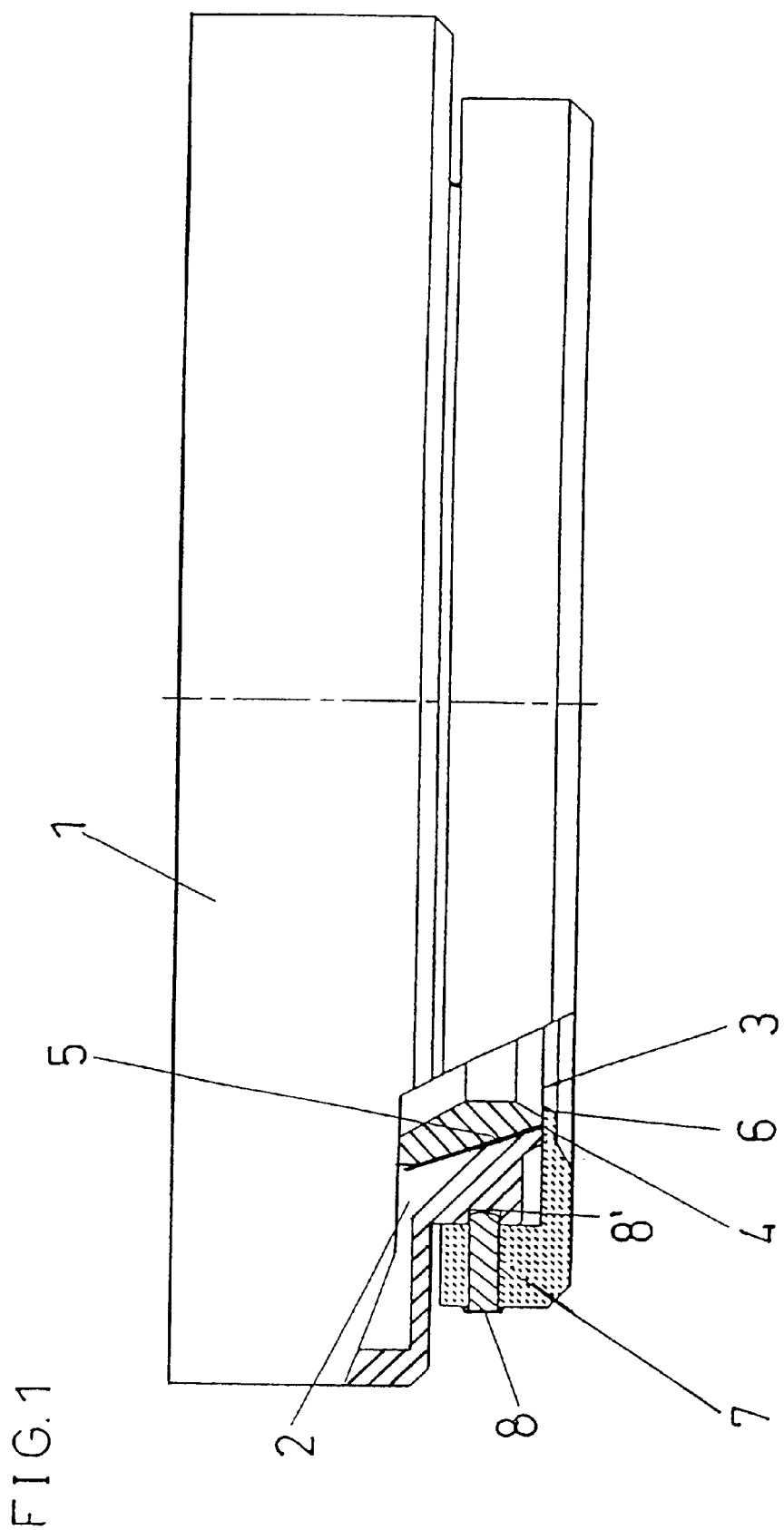

ATTACHMENT LENS

FIELD OF THE INVENTION

This invention relates to an attachment lens for an annular illumination system which extends along a rotational axis for distributing the intensity of light beams emanating annularly from a light emanating surface of the illumination system onto an object to be illuminated. The annular illuminating system is preferably formed as a fiber optic illuminating system, but could comprise any light guide adapted to guide entering light beams to the annular light emanating surface. For example a light guiding plastic body could be used. The attachment lens comprises a ring-shaped optical element to be arranged concentrically with respect to said annular light beams and said rotational axis which ring-shaped optical element has a first rotationally symmetrical zone of a refractive power which increases towards the rotational axis.

BACKGROUND OF THE INVENTION

Annular light beams are used, for example, for illuminating an object with impinging light in a microscope. In such an arrangement, light of a cold light source is guided through a light guide, generally formed by a multitude of individual fibers, to the annular illumination system and its annular light emanating surface which is arranged around the lens of the microscope. The light guide or the fibers of it extend through a concentric ring-shaped gap, and are distributed uniformly over the area of this gap. When producing and machining the emanating surface of light guiding fibers, the fibers of the light guide pass the ring-shaped gap inclined to the rotational axis of the annular illumination arrangement and of the microscope lens, and are polished parallel to the plane of the gap.

By this geometrical configuration the cone of the emanating light is asymmetrical to the symmetry or rotational axis of the annular illumination system due to the manufacturing conditions, and the object field is illuminated homogeneously from a minimum working distance of 20 mm on.

With a working distance longer than about 300 mm, however, more and more beams of the emanating light cone leave the range near the axis and, therefore, do not contribute to object illumination. This is a great disadvantage, because the illumination intensity, thus, decreases with increasing working distance.

It has been suggested already to avoid this disadvantage in that some fiber groups of the annular illumination system are pivotable or displaceable with respect to the axis of symmetry in order to be able, in the case of longer object distances, to focus onto the object. This known approach, however, involves an expensive mechanical construction and, moreover, does not result in a homogeneous distribution of light intensity, as required, because the number of fiber groups arranged at the periphery of the annular illumination system.

SUMMARY OF THE INVENTION

It is, therefore, an object of the invention to provide an attachment lens for an annular illumination system which avoids the disadvantages of known annular illumination systems, enables focusing of light on the object, particularly with varying working distances, in a simple way and the utmost light intensity, and enables an adaptation to the object size, thus avoiding a dark spot within the range of the axis of symmetry of the system.

According to the invention, an attachment lens for an annular fiber optic illumination system of the type described in the outset is provided that a second zone substantially for light beams which are aligned or parallel to said rotational axis adjacent, this second zone being concentric to the first zone and substantially free of any refractive power. Furthermore, the distance between the ring-shaped optical element and the light emanating surface of the light guiding fibers may be adjustable either by a displaceable device and/or a rotatable holding ring.

By this construction it is provided in an advantageous manner that even with longer working distances, the light beams which are inclined to the axis of symmetry or the rotational axis are projected onto the object in such a manner that a maximum possible homogeneous light intensity is obtained. For focusing in the case of varying working distances, but also for adapting the illuminated area to the object size, the distance between the optical element and the light emanating surface of the light fibers can be adjusted in a beneficial manner either by a displaceable adjustment device and/or a rotatable holding ring.

For producing it in a simple and inexpensive way, the invention provides, according to a further characteristic, that the ring-shaped optical element is made of plastic material. Preferably, this optical element is formed integrally with the holding ring. In this way, the attachment lens can be manufactured in an inexpensive manner, the mounting expenditure being low.

BRIEF DESCRIPTION OF THE DRAWINGS

An embodiment of the invention is schematically illustrated by way of example in the drawings, wherein FIG. 1 shows an annular illumination system and an optical element according to the invention;

In FIG. 1 an annular illumination system is generally designated 1. This annular illumination system is arranged around the lens of a microscope not shown and serves for illuminating the object to be examined. The annular illumination system 1 is merely schematically illustrated in the figure wherein the left side shows the annular illumination system partly in cross-section while the right side depicts it in a lateral view.

Figure 2A:
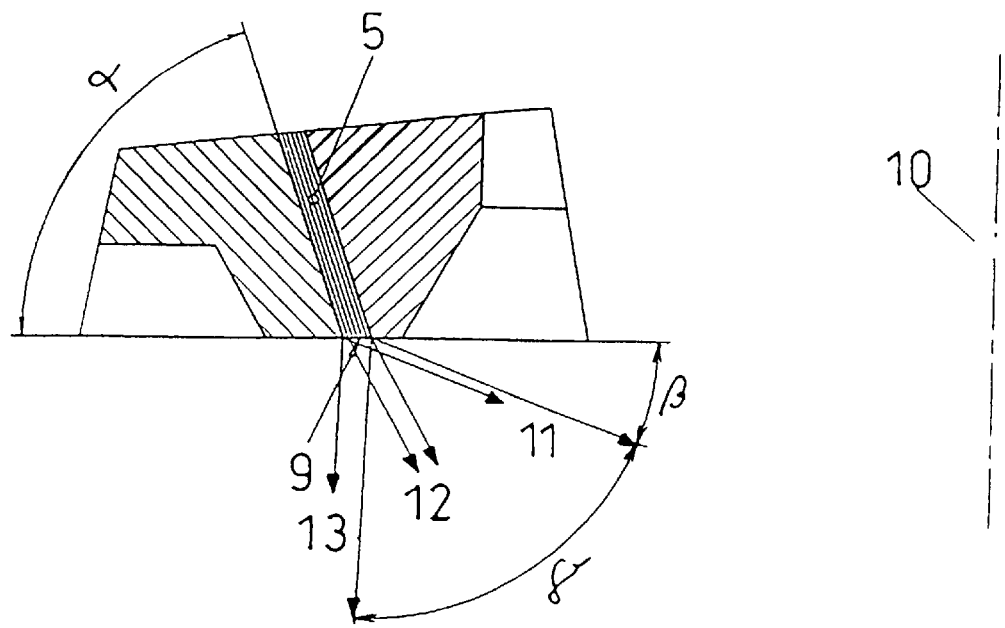
FIG. 2a illustrates the light beams when emanating from the light fibers.

Light, e.g. of a cold light source, is guided by a fiber guide including fibers 5 into a cavity 2 of the annular illumination system 1. At a lower annular surface 3 that faces the object side, an annular gap 4 is provided into which the fibers 5 of the light guide run while being evenly distributed over the whole annular surface 3 of the gap. The light emanating surface of all fibers 5 is planely ground and polished in the plane of the annular surface 3.

The gap 4 may have, for example, an average diameter of 56 mm and a constant width within a range of 0.5 to 0.75 mm. The numerical aperture of the fibers made of glass may be 0.57.

An optical element 6 faces the gap 4 and the fibers 5 and is, preferably, formed as an ring-shaped or approximately toroidal, convex lens of plastic. This optical element 6 may be formed integrally with a holding ring 7 (or other adjustment device, such as a displaceable adjustment handle). Thus, the optical element 6 and the holding ring 7 form a structural unit rotatably supported on the peripheral wall of the annular illumination system, a guide pin 8 engaging a helical guiding groove 8'. Suitably, three guide pins 8 are uniformly distributed over the periphery of the holding ring 7 in a manner not shown. Thus, rotating the optical element 6 will result in varying the distance between the optical element 6 and the light emanating surface of the fibers 5. The ring-shaped optical element 6 is co-axial to the dash-dotted axis of symmetry (designated 10 in FIG. 2a) of the microscope lens not shown.

It will be clear to those skilled in the art that any other means for guiding the holding ring 7, particularly when moving in a direction parallel to the dash-dotted axis towards and from the light emanating surface 9, may be used, such as a groove parallel to this axis. For some special illumination effects, it may even be desirable to guide the holding ring 7 transversely to the dash dotted axis or even to move it into a tilted relationship with respect to the axis. Nevertheless, it will also be clear that for some applications it would be sufficient to have the element 6 in a fixed distance from the light emanating surface 9 which may be a zero-distance, as described later with reference to FIG. 3a.

In FIG. 2a a detail is shown which illustrates that light emanating cone (aperture angle γ) is asymmetric with respect to the axis of symmetry 10 of the annular illumination system due to machining and providing a respective emanation surface 9 under an angle α. The emanation surface 9 itself is suitably orthogonal to the axis of symmetry 10.

The light beams emanate under various angles β, the inner marginal beams, which are directed towards the axis of symmetry 10 being designated 11, the middle beams being designated 12 and the outer marginal beams, that extend almost parallel to the axis of symmetry 10, being designated 13.

Figure 2B:
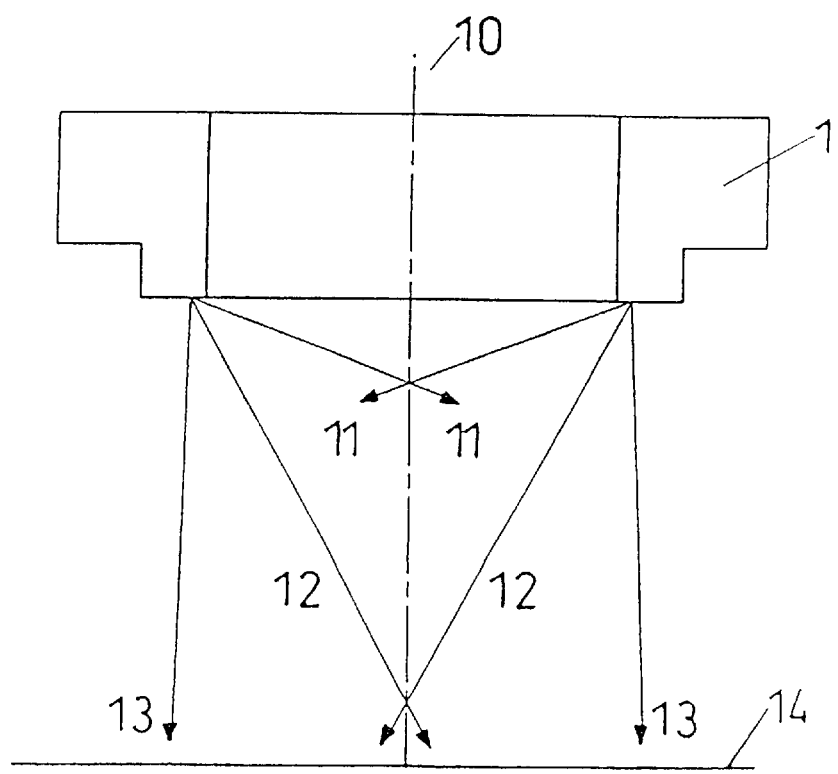
FIG. 2b represents the geometrical situation of the light beams without an optical element according to the present invention.

FIG. 2b shows the geometry of these light beams 11, 12 and 13 towards an object 14 to be illuminated. It may be seen that, with the distance shown between the object 14 and the annular illumination system 1, the inner marginal beams 11 do not illuminate the object 14 so that there is clearly a loss in light intensity.

Figure 3A:
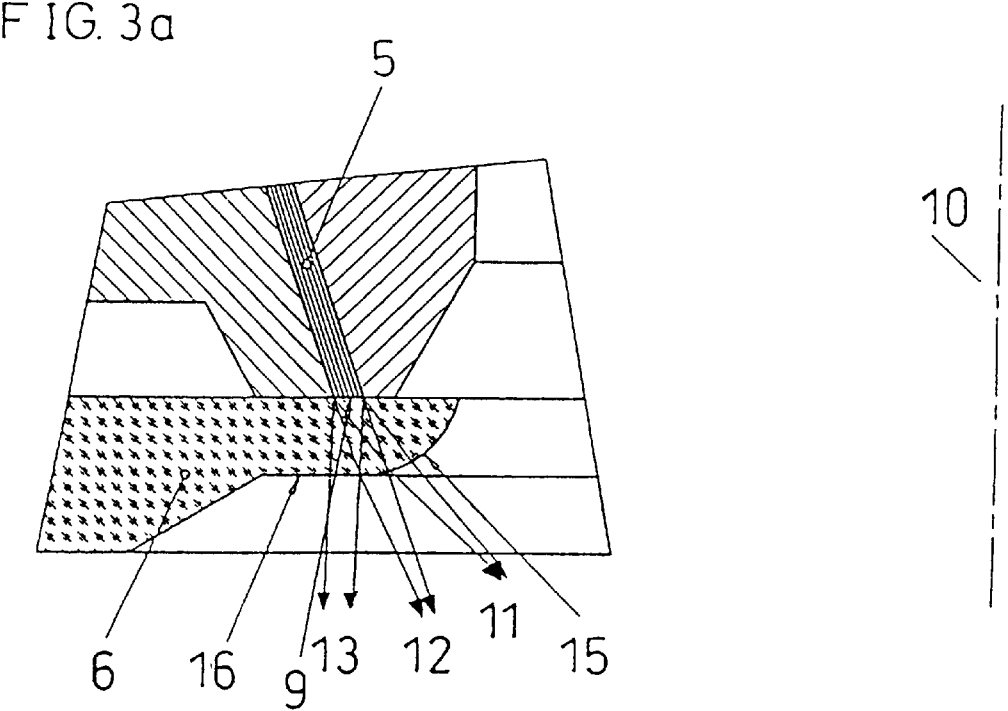
FIG. 3a shows the light beams emanating from the optical element when it engages the light emanating surfaces of the fibers.
Figure 3B:
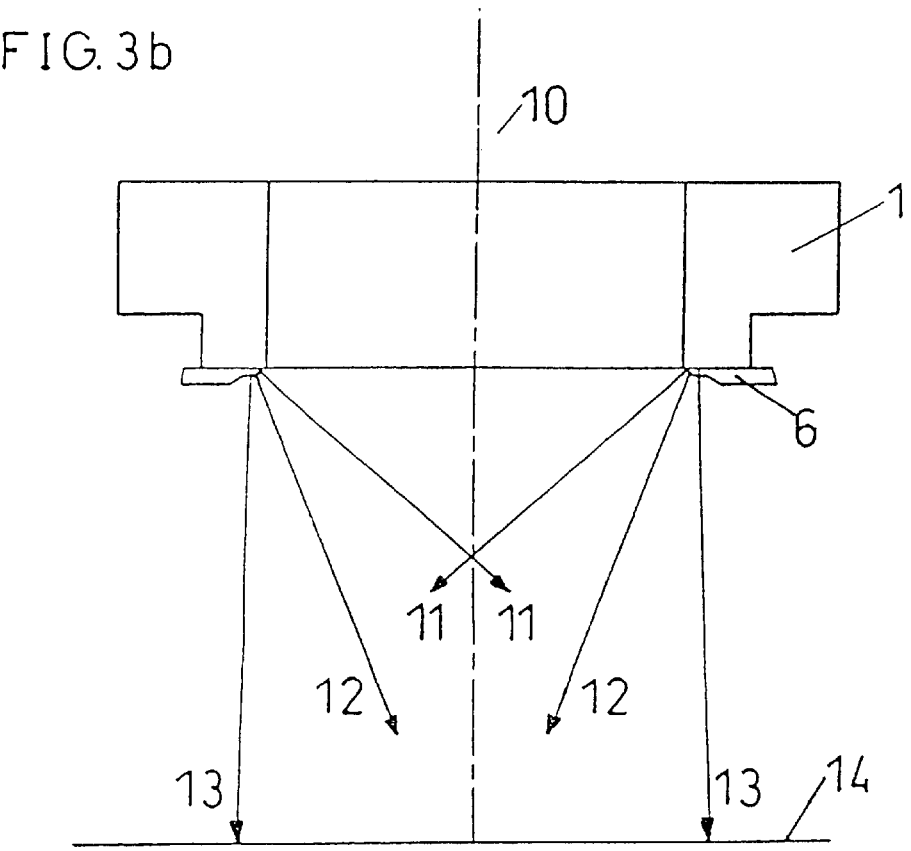
FIG. 3b represents the geometrical situation of the light beams with an optical element according to the present invention which engages the light emanating surfaces of the fibers.

When using the attachment lens or the optical element 6 according to the invention, however, as depicted in FIG. 3a, an increase in illumination intensity of the object 14 is achieved. The optical element 6, of which only a portion is shown, is formed as a ring-shaped lens (consisting preferably of a single lens element, although there may be more) and has such a geometry that the light beams emanating under different angles β (as in FIG. 2a) pass through a course of zones 15 which are clearly optically effective to a different extent. To accomplish this, the ring-shaped or toroidal lens is formed as a convex rotation symmetrical lens effective for those light beams 11 and 12 which are inclined to the axis of symmetry 10. The smaller the emanating angle β (see FIG. 2a) of the inclined light beams, the more these light beams 11, 12 are deviated towards a longer distance of the object to be illuminated, which results in a clearly increased light intensity at the object 14, as is shown in FIG. 3b.

Within the range of the light beams 13 that extend almost parallel to the axis of symmetry 10, the optical element 6 has no or almost no diffractive power and is, preferably, formed as a plane parallel plate.

Figure 4A:
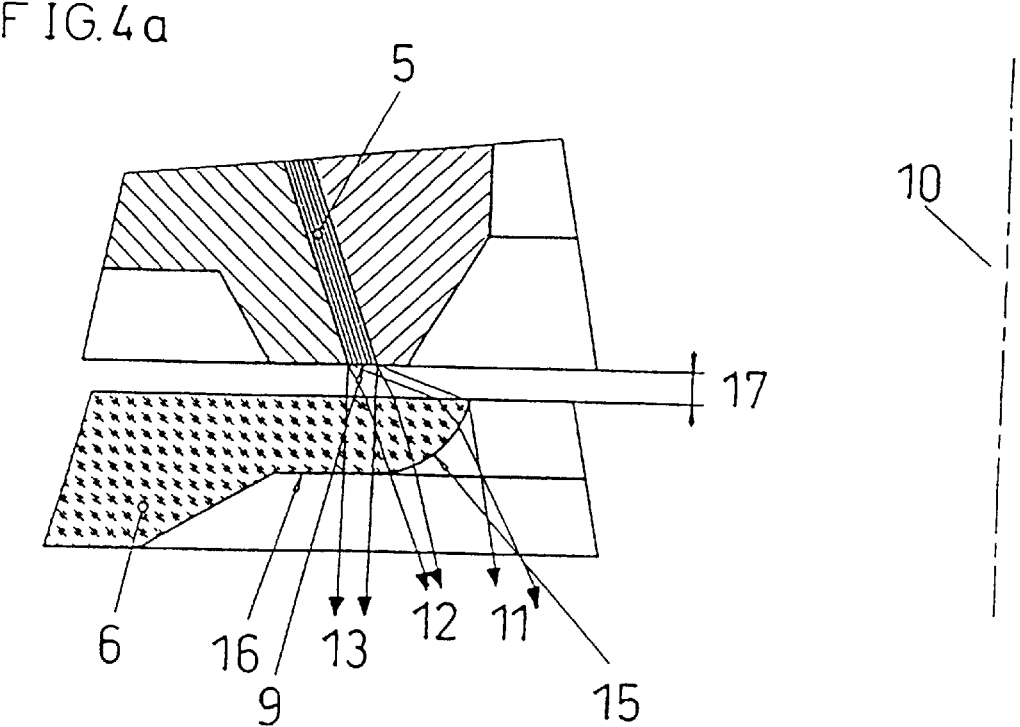
FIG. 4a shows the light beams emanating from the optical element when it is in a distance to the light emanating surfaces of the fibers; aFIG. 4b represents the geometrical situation of the light beams with an optical element according to the present invention which is in a distance to the light emanating surfaces of the fibers.
Figure 4B:
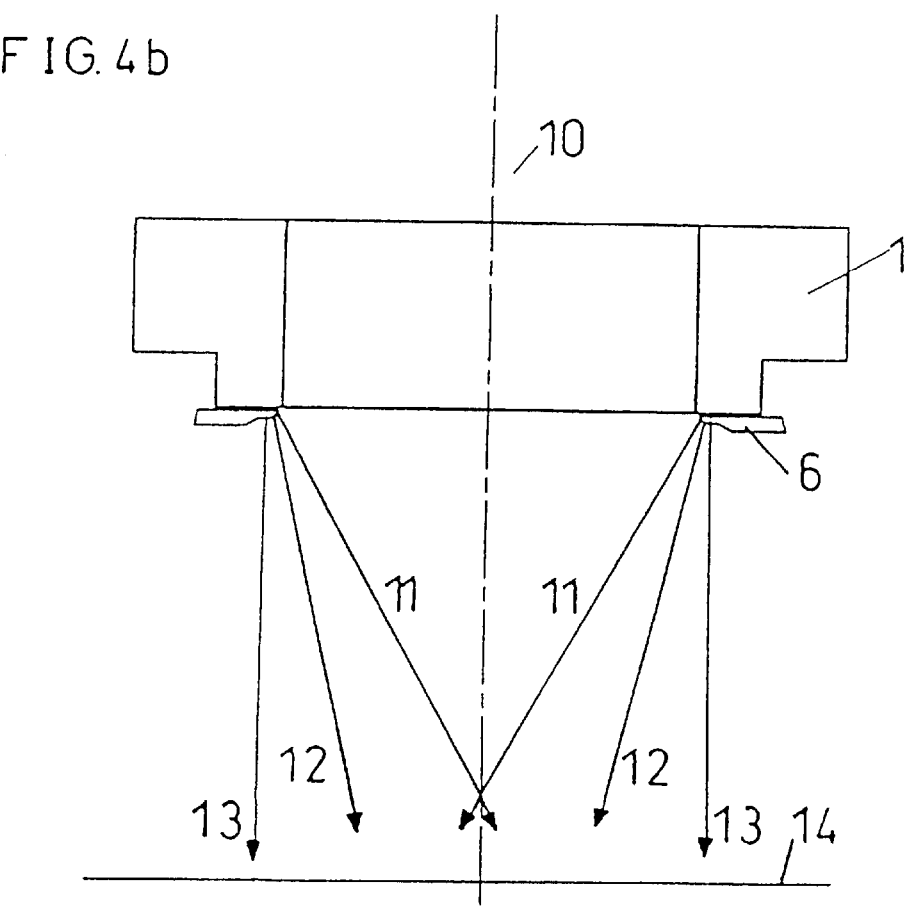

If the optical element 6, described with reference to FIG. 1, is positioned in a distance 17 from the light emanating surface 9 as shown in FIG. 4a, the inclination to he axis of symmetry 10 of the light beams 11, 12 projected is changed in such a way that a deviation towards an even longer object distance is obtained, as is illustrated in FIG. 4b. The enlargement of the distance 17 has the effect that a larger diffractive power of the zone 15 becomes effective for beams which emanate under a small angle β (see FIG. 2a).

Thus, it will be seen that the distance 17 is preferably variable between a zero-distance, as in FIG. 3a to a certain maximum distance which may be that of FIG. 4a depending on the pitch and length of the groove 8' (FIG. 1). Of course, the curvature of the lens element 6 and the pitch and length of the groove 8' may also be chosen in such a manner that the element 6 has a certain minimum distance from the light emanating surface 9 other than zero.

By varying the distance 17, focusing conditions of the light beams, the size of the illuminated area and the homogeneity of light in the illuminated area can be adjusted. This is also possible with different working distances.

Figure 5:
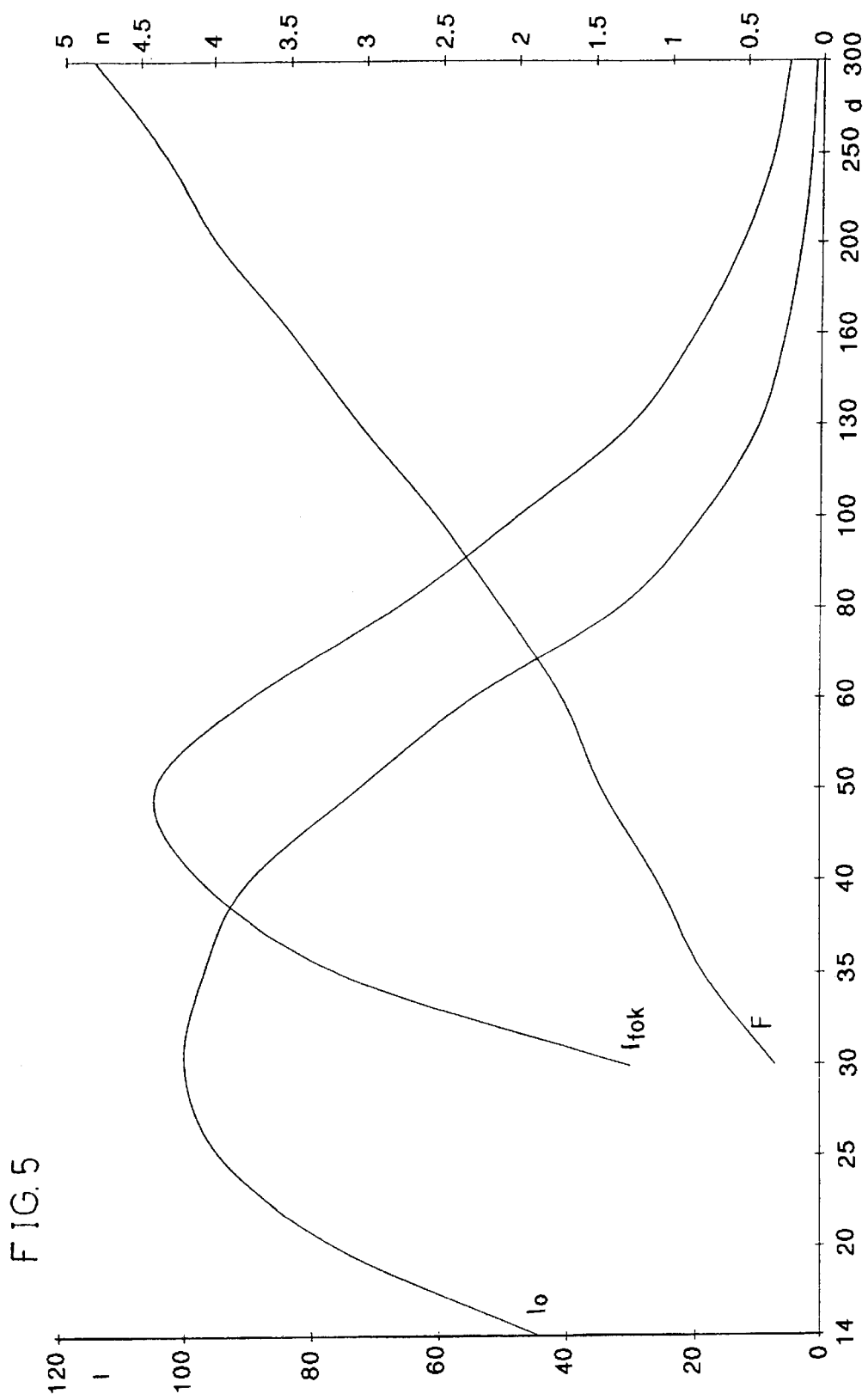
FIG. 5 is a graph of light flux versus working distance.

The graph of FIG. 5 shows the gain in illumination intensity by the use of attaching the lens 6 according to the invention to the annular illumination system 1. The working distance d between the annular illumination system 1 and the object 14 is plotted on the abscissa in a range of 20 to 300 mm, and the light flux I is plotted on the ordinate at left. Curve Io illustrates the illumination intensity without using the attachment lens, while curve Ifok shows the illumination intensity achieved by the use of an attachment lens according to the invention focused to different working distances.

On the ordinate at right, the factor n of the increase in illumination intensity is plotted which is obtained by the use of an attachment lens according to the invention. The assigned curve is designated F.

What is claimed is:

1. An attachment lens for an annular illumination system which extends along a rotational axis for distributing the intensity of light beams emanating annularly from a light emanating surface of said illumination system onto an object to be illuminated, said attachment lens comprising:

a ring-shaped optical element to be arranged concentrically with respect to said annular light beams and said rotational axis in a desired relationship to said light emanating surface of said illumination system, said ring-shaped optical element having a first rotationally symmetrical zone of a refractive power which increases towards said rotational axis for said annular light beams emanating from said illumination system; and a second zone substantially for light beams which are aligned or parallel to said rotational axis, said second zone being adjacent and concentric to said first zone and substantially free of any refractive power.

2. Attachment lens as claimed in claim 1, wherein said illumination system comprises a fiber optic light guide.

3. Attachment lens as claimed in claim 1, wherein said second zone is formed as a plane parallel plate.

4. Attachment lens as claimed in claim 1, wherein said relationship comprises a desired distance between said ring-shaped optical element and said light emanating surface, the lens further comprising means for varying said distance.

5. Attachment lens as claimed in claim 4, wherein said distance comprises a range from a zero distance up to a predetermined maximum distance.

6. Attachment lens as claimed in claim 4, wherein said varying means are displaceable parallel to said rotational axis.

7. Attachment lens as claimed in claim 4, wherein said varying means comprise an annular adjustment member rotatable about said rotational axis.

8. Attachment lens as claimed in claim 1, wherein said ring-shaped optical element is of plastic material.

9. Attachment lens as claimed in claim 8, further comprising an annular adjustment member rotatable about said rotational axis for varying said distance between said ring-shaped optical element and said light emanating surface, said ring-shaped optical element and said annular adjustment member being integrally formed of plastic material.

\* \* \* \* \*